(12) United States Patent
Corwin

(10) Patent No.: US 10,329,784 B1
(45) Date of Patent: Jun. 25, 2019

(54) CUSTOMIZABLE POOL AUTOMATION CONTROL SYSTEM, AND METHOD FOR CUSTOMIZING POOL AUTOMATION CONTROL

(71) Applicant: Wincor, LLC, Weddington, NC (US)

(72) Inventor: Thomas M. Corwin, Waxhaw, NC (US)

(73) Assignee: WINCOR, LLC, Weddington, NC (US)

( * ) Notice: Subject to any disclaimer, the term of this patent is extended or adjusted under 35 U.S.C. 154(b) by 0 days.

(21) Appl. No.: 15/697,970

(22) Filed: Sep. 7, 2017

Related U.S. Application Data

(60) Provisional application No. 62/384,431, filed on Sep. 7, 2016.

(51) Int. Cl.
| | | |
|---|---|---|
| *G05B 15/02* | (2006.01) | |
| *E04H 4/00* | (2006.01) | |
| *E04H 4/12* | (2006.01) | |
| *E04H 4/14* | (2006.01) | |

(52) U.S. Cl.
CPC ........... *E04H 4/1209* (2013.01); *E04H 4/129* (2013.01); *E04H 4/1236* (2013.01); *E04H 4/1245* (2013.01); *E04H 4/1281* (2013.01); *E04H 4/148* (2013.01); *G05B 15/02* (2013.01)

(58) Field of Classification Search
CPC .................................. E04H 4/00; G05B 15/02
See application file for complete search history.

(56) References Cited

U.S. PATENT DOCUMENTS

| | | | | |
|---|---|---|---|---|
| 2002/0089235 | A1* | 7/2002 | Loyd ...................... | A61H 33/60 307/149 |
| 2014/0303782 | A1* | 10/2014 | Pruchniewski ......... | H04L 47/70 700/275 |
| 2018/0240322 | A1* | 8/2018 | Potucek ............... | G08B 21/187 |

* cited by examiner

*Primary Examiner* — Mark A Connolly
(74) *Attorney, Agent, or Firm* — Schwartz Law Firm, P.C.

(57) ABSTRACT

A customizable pool automation control system includes a system housing defining a protective enclosure. A processor is located within the housing. A plurality of expansion slots are formed with the housing, and operatively communicate with the processor. A plurality of modular external expansion cards are adapted for being custom selected by a user and inserted into respective expansion slots. The expansion cards are selected from a group consisting of a chlorine generator control, a water level control, a camera control, a valve actuator control, and a relay control.

20 Claims, 6 Drawing Sheets

CUSTOMIZABLE POOL AUTOMATION CONTROL SYSTEM, AND METHOD FOR CUSTOMIZING POOL AUTOMATION CONTROL

TECHNICAL FIELD AND BACKGROUND OF THE DISCLOSURE

The present disclosure relates broadly and generally to a customizable system and method for pool automation control. The present system and method of the exemplary disclosure is applicable in any in-ground or above-ground, indoor or outdoor swimming pool, spa, hot tub or other such environment requiring periodic attention, water care and maintenance.

Swimming pools generally incorporate many interconnected devices and components, all of which much be properly maintained to function correctly. Pumps, filters, valves, heaters, sensors, lights, air injectors, water features, and the like are often integrated to form a functional pool system. Additionally, proper filtering and water flow must be maintained to remove debris from the water, and to circulate the water to insure even distribution of chemicals. There is a need in the industry for a system that can centrally control and automate one or more of these functional pool components, and enable programmed scheduling of certain tasks. The exemplary system may also monitor current pool conditions and drive alerts to the pool owner when things are running outside of set parameters.

The exemplary system may enable pool control and monitoring from locations outside of the main hardware via wireless access to alleviate the need to physically access the hardware to monitor or change equipment behavior. By allowing access locally via Wi-Fi, Bluetooth, RF or other wireless connection, and remotely through the Internet, the pool owner can monitor and control the pool from within the house, by the pool, and even from a great distance.

SUMMARY, OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a pool control system including a microprocessor controller, a main PCB board with core functionality, optional expansion cards, power supply(s), relays, sensors, enclosure, and optional touchscreen; the entirety of which may be used to control pool equipment such as pumps, lights, heaters, valves and more. The exemplary system includes actions and schedules programmable by the owner or owner's agent via a user interface accessible using optional integrated touchscreen, computer and/or various electronic devices. This gives the owner full access to view or control the status of the attached pool elements. The exemplary system may also feature user programmable alerts that are automatically sent to the owner if certain programmed events occur that are outside of preset limits.

The exemplary pool automation control system of the present disclosure may be compatible with and capable of controlling one or more of the following:

All existing single and two speed pumps.
Externally programmed variable speed pumps through use of flow control checks to verify operation of the pump before executing actions (such as activating the salt water generator).
Existing 24 VAC controlled valve actuators.
Externally controlled heating/cooling systems.
Pool lighting.
Landscape lighting.
Any additional equipment that can be controlled via power through relays.
Existing flow sensors that work by closing wire loop (allowing current flow) when flows of at least 15 gallons per minute register, and open the loop (stopping current flow) when no or low flow is registered.

The exemplary pool automation control system of the present disclosure may also feature a customizable expansion system allowing the ready and convenient connection of user-selected modular expansion cards. For example, one expansion card may enable wireless remote and automated control of salt water generator (SWG) cells. Other exemplary expansion cards may:

Increase number of relays controllable through the system (exemplary base system has 8).
Increase number of valve actuators controllable through the system (base system has 4).
Enable attachment of video cameras to display live views of pool, equipment, landscape or other surrounding area.
Enable automated (e.g., programmed) control of level sensor, fill valve, and drain valve to maintain and monitor current pool water level.

In other exemplary embodiments, the pool automation control system may comprise a secondary control board (SCB) with additional expansion slots (or ports) in order to further extend customization of the present system to meet the requirements of the particular user.

The exemplary pool automation control system of the present disclosure may also feature one or more of the following:

At least one compatible flow sensor for each pump installed, if the pump is to be monitored for operation.
Multiple temperature sensors for monitoring ambient air temperature and water temperature when pool water is flowing.
Wi-Fi or Ethernet cable access to local network for local control and Internet access from that network for remote control. If not connected to a local network, the exemplary system may automatically function as a Wi-Fi hotspot to allow connections locally.
110-120 VAC or 220-240 VAC wired to system transformer to power internal components.

According to another exemplary embodiment, a customizable pool automation control system comprises a system housing defining a protective enclosure. A processor is located within the housing. A plurality of (identical) expansion slots are formed with the housing, and communicate with the processor. A plurality of modular external expansion cards are adapted for being custom selected by a user and inserted into respective expansion slots. The expansion cards are selected from a group consisting of a chlorine generator control, a water level control, a camera control, a valve actuator control, and a relay control.

According to another exemplary embodiment, a plurality of external sensors are operatively connected to the processor.

According to another exemplary embodiment, the sensors are selected from a group consisting of water flow sensor, water level sensor, ambient air temperature sensor, and water temperature sensor.

According to another exemplary embodiment, a wireless data communication module is operatively connected to the processor, and adapted for transmitting data between the pool automation control system and a remote computer.

According to another exemplary embodiment, the remote computer comprises a network server.

According to another exemplary embodiment, the remote computer comprises a mobile device.

According to another exemplary embodiment, a main control board is located within the system housing.

According to another exemplary embodiment, a system on chip (SOC) is mounted on the main control board.

According to another exemplary embodiment, the main control board further comprises a plurality of sensor input connectors.

According to another exemplary embodiment, the main control board further comprises a plurality of device control connectors.

According to another exemplary embodiment, the main control board further comprises a plurality of relay connectors.

According to another exemplary embodiment, the system housing comprises a touchscreen user interface operatively connected to the processor.

According to another exemplary embodiment, the system housing comprises a removable exterior cover.

The term "operatively connected" is broadly defined herein to mean direct physical (wired), indirect physical, or wireless communication/connection between components.

The term "modular expansion card" refers to cards having standardized dimensions and connectors adapted to operatively insert into existing expansion slots of the MCB. In other words, a given expansion card may operatively insert into any selected one of a plurality of identical expansion slots formed with the MCB.

The term "remote computer" refers broadly and generally to any general or specific purpose machine with processing logic capable of manipulating data according to a set of program instructions, and physically located outside of the present ACS. For example, the remote computer may comprise a mobile computing device (or other client device), such as a laptop computer, netbook, e-reader, tablet computer, mobile phone, smartphone, personal digital assistant, desktop, and others. The remote computer may also comprise a cloud server, dedicated server or physical server.

Exemplary Computing Environment

In an exemplary implementation discussed further below, the present system and method operates in an environment utilizing a client device in communication with a host server (e.g., cloud server) over a computer network, such as the Internet. Exemplary client device may comprise any suitable computing device—also referred to herein as a "remote computer". The exemplary computing device supports wireless communication, and may also be referred to herein as a system, device, subscriber unit, subscriber station, mobile station (MS), mobile, mobile device, remote station, remote terminal, user terminal, terminal, communication device, user agent, user device, cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. These various devices all provide and/or include the necessary hardware and software to support the various wireless or wired communication functions as part of a communication system.

In other embodiments, other computer networks, for example, a wide area network (WAN), local area network (LAN), or intranet, may be used. The host server may comprise a processor and a computer readable medium, such as random access memory (RAM). The processor is operable to execute certain pool automation control programs and other computer program instructions stored in memory. Such processor may comprise a microprocessor (or any other processor) and may also include, for example, a display device, internal and external data storage devices, cursor control devices, and/or any combination of these components, or any number of different components, peripherals, input and output devices, and other devices. Such processors may also communicate with other computer-readable media that store computer program instructions, such that when the stored instructions are executed by the processor, the processor performs the acts described further herein. Those skilled in the art will also recognize that the exemplary environments described herein are not intended to limit application of the present system and method, and that alternative environments may be used without departing from the scope of the invention.

Various problem-solving programs incorporated into the present system and method, and discussed further herein, utilize as inputs, data from a data storage device or location. In one embodiment, the data storage device comprises an electronic database. In other embodiments, the data storage device may comprise an electronic file, disk, or other data storage device. The data storage device may store features of the invention applicable for customizing pool automation control. The data storage device may also include other items useful to carry out the functions of the present system and method. In one example, the present computer programs comprise algorithms designed and configured to perform calculations and generate data applicable in a system and method for customizing pool automation control. The resulting calculations and data may be transferred over the computer network to the client device.

BRIEF DESCRIPTION OF THE DRAWINGS

Exemplary embodiments of the present disclosure will hereinafter be described in conjunction with the following drawing figures, wherein like numerals denote like elements, and wherein.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
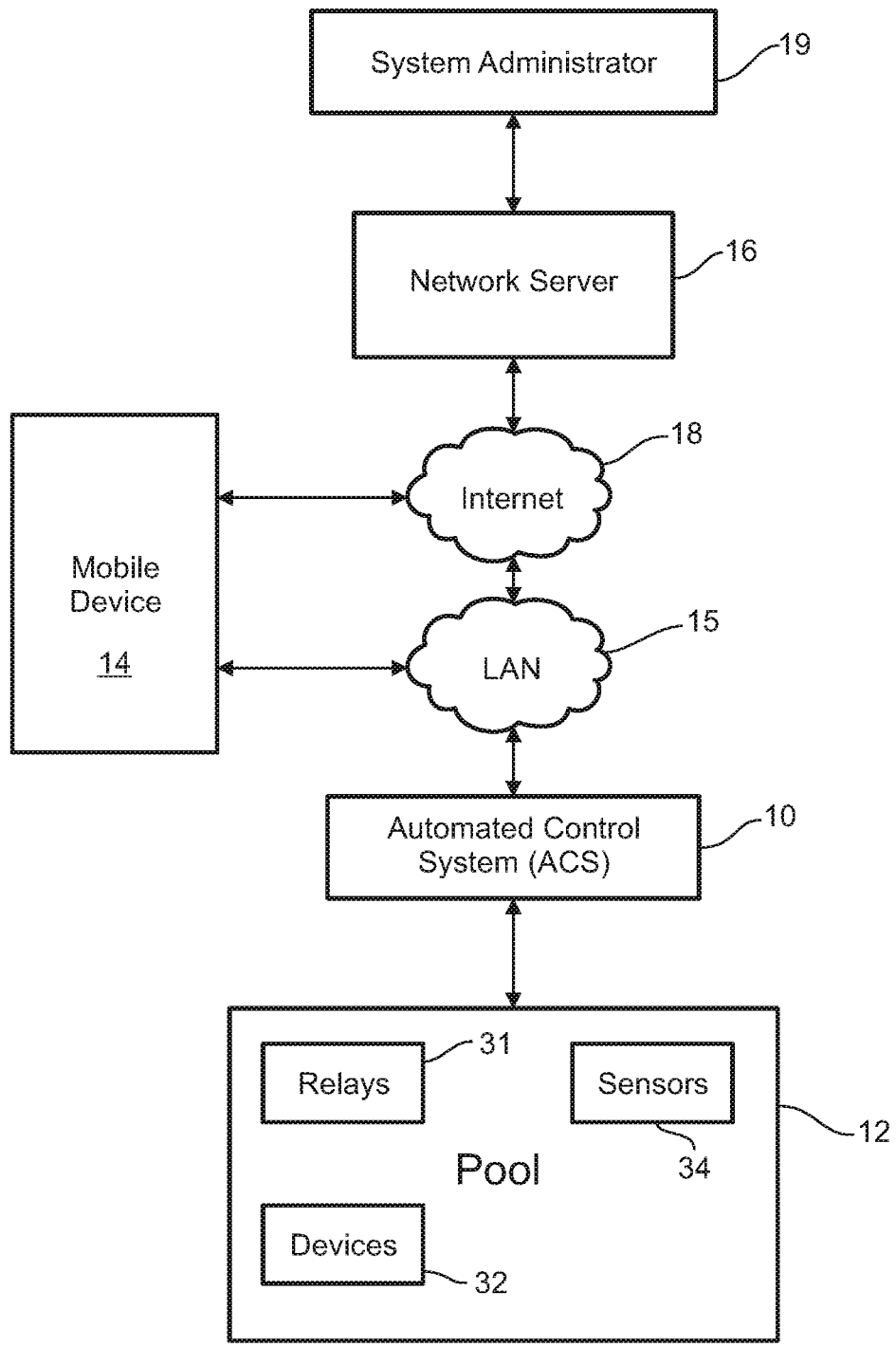
FIG. 1 is a diagram illustrating exemplary components and features of the present system and method for pool automation control.

Referring now specifically to the drawings, a pool automation control system (referred to herein as "ACS" or "System") according to one exemplary embodiment of the present disclosure is illustrated diagrammatically in FIG. 1, and shown generally at broad reference numeral 10. The exemplary ACS is applicable for use with any in-ground or above ground, indoor or outdoor pool, spa, hot tub or the like (collectively herein, "pool"—indicated at reference numeral 12). System hardware, software, and firmware components cooperate to provide an automated pool control system 10 capable of wireless remote access, and applicable for scheduling, controlling and completing various pool maintenance and environmental tasks, and for monitoring pool status and reporting realtime and historical pool conditions. In exemplary embodiments, the present ACS 10 may be accessed wirelessly using any suitable mobile computing device 14 (e.g., smartphone). Wireless access may be made locally via LAN 15 through Bluetooth, Wi-Fi, or other wireless connection, or remotely through a centralized server 16 and global communications network 18, such as the Internet. Access may be password-protected by the user. The exemplary pool ACS 10 may also communicate with a system administrator to enable remote servicing, maintenance, troubleshooting, and software support—allowing technicians to remotely diagnose and repair system and pool operational issues, provide software updates, and make any program changes as specified by the user.

Figure 2:
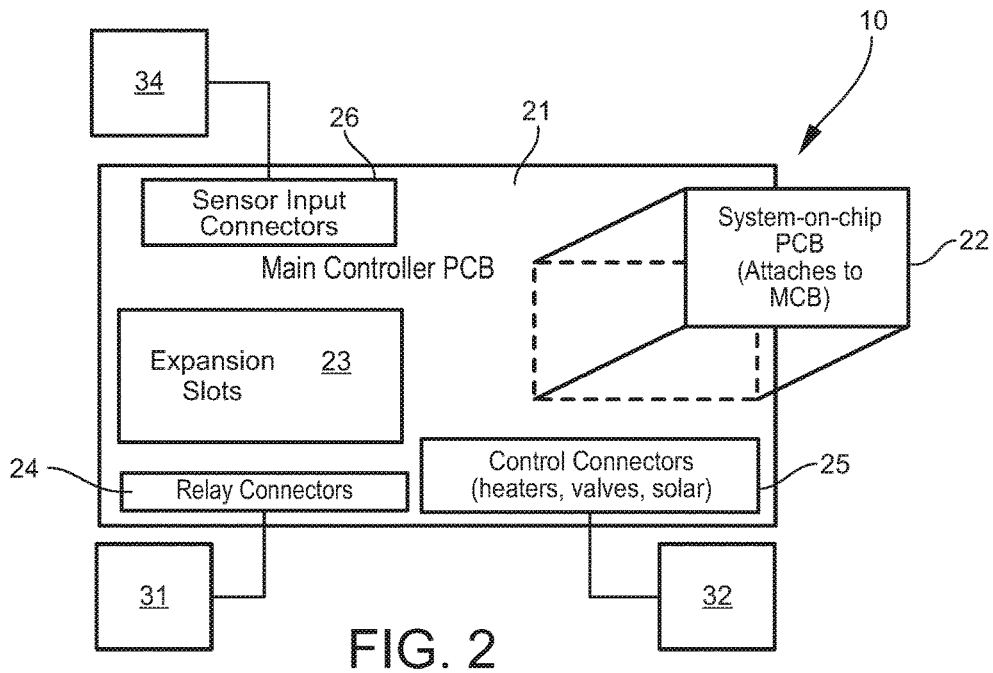
FIG. 2 is a block diagram illustrating various exemplary components of the present pool automated control system (ACS)
Figure 3:
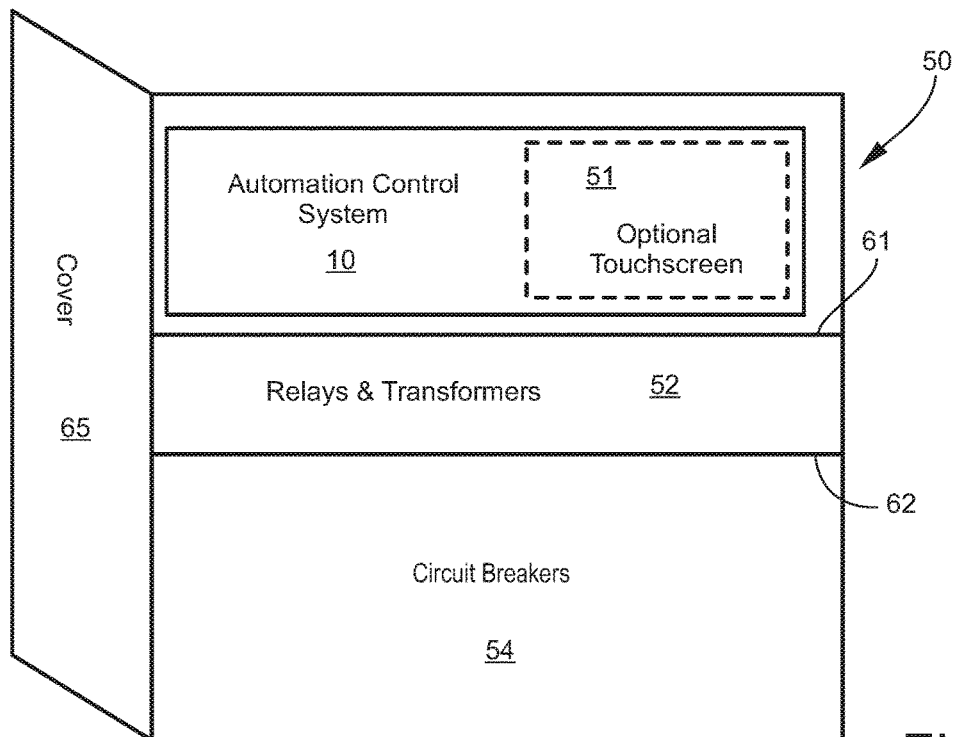
FIG. 3 is a block diagram illustrating various exemplary components utilized in the present ACS housed in a protective control box.

Hardware block diagrams illustrating exemplary components of the present ACS 10 are included in FIGS. 2 and 3. Exemplary hardware components comprise a main control board (MCB) 21, a system-on-chip (SOC) board 22, expansion slots 23, relay connectors 24, device output control connectors 25, and sensor input connectors 26. The relay connectors 24 enable use of custom-selected modular relays 31 applicable for controlling operation of any electronic pool device and integrated or surrounding electrical equipment, including single and dual speed pumps, pool lights, landscaping lights, fans, spa bubblers, cleaning equipment, and the like. The output control connectors 25 enable automated and user-programmed control of various onboard pool devices 32 including automatic valve actuators, and activation of low voltage controlled heaters, solar pumps, and others. The exemplary pool ACS 10 may also incorporate specific input connectors 26 for various internal and external sensors 34 including flow sensors, temperature sensors, and others.

As discussed further below, the expansion slots 23 allow ready and convenient customization of the present ACS 10 through the addition various modular plug-and-play external expansion cards 41 (See FIGS. 4A-4C). These modular cards 41 may selectively expand the functionality of the MCB 21 to meet specific needs of a particular user, and provide flexibility for future growth as new devices 32 and sensors 34 are developed. Through the use of slot-specific addressing and expansion card type specific settings, the present ACS 10 may sense and automatically adjust to any expansion card 41 connected in a given slot 23. Additionally, the sensor input connectors 26 may enable the pool ACS 10 to act on data captured by the various integrated and external (wired or wireless) sensors 34. The exemplary sensors 34 may determine conditions, such as air temperature, water temperature, water level, pH level, chlorine level, pump conditions (e.g., pump on but without water flow), and even error conditions within the controller itself. In the event of a programmed threshold condition, such as low water temperature, the pool ACS 10 may automatically alert the owner via e-email, SMS text message, or other communication means, and may also simultaneously active a system connected device 32, such as a pool heater. Devices 32 may be hardwired to the MCB or wirelessly connected.

In exemplary embodiments, the present ACS 10 is housed in a dedicated weatherproof control box 50 or other enclosure mounted above ground proximate the pool, pool deck, or equipment pad. As indicated diagrammatically in FIG. 3, the exemplary control box 50 houses components utilized in the exemplary ACS 10, including an optional touchscreen interface and display 51, relays and transformers 52, and circuit breakers 54. The MCB 21 of the present ACS 10 serves as the base for all controller electronics, including the system-on-chip (SOC) 22. The exemplary SOC 22 is an integrated circuit (IC) that integrates components of the ACS 10, and may contain digital, analog, mixed-signal, and radio-frequency functions. Any custom-selected expansion cards 41 are operatively connected to the MCB 21 via expansion slots 23, as discussed further below, while all relays 31, control devices 32, and sensors 34 operatively connect via relay connectors 24, control connectors 25, and sensor input connectors 26, respectively. Electrical power is supplied to the MCB 21 from transformer with separators 61, 62 located between a high voltage area (relays and transformer) and the ACS low voltage area. The optional touchscreen interface 51 is operatively connected to the MCB 21, and selectively accessed by opening or removing a protective cover panel 65. The exemplary MCB 21 may be attached to a rear wall of the control box 50, and likewise selectively accessed when the cover panel 65 is opened or removed.

The exemplary control box 50 will house the MCB 21, SOC 22, expansion slots 23, and connectors 24, 25, and 26 in an upper half of the enclosure, and a DIN rail and/or relay back plane in a lower half of the enclosure. The power supply (e.g., 120 VAC and/or 240 VAC—as needed) connects to the control box 50, and is distributed to components located in the lower half. Low voltage cables may be run between the lower half and upper half of the control box supplying current (e.g., 24 VAC) to the MCB 21, and allowing the MCB 21, expansion slots 23 and connectors 24-26 to wire back to the relays in the lower half of the enclosure, or to exit the enclosure to operatively connect to sensors, actuators, or other external devices. The exemplary control box 50 is particularly applicable for use with an existing breaker panel, such as that commonly located at the pool equipment pad. Alternatively, the control box 50 may incorporate a lower housing below the DIN rail for storing circuit breakers 54 (See FIG. 3).

The touchscreen user interface 51 at the control box 50 may be used to custom set or program all pool ACS devices, sensors, actions, schedules, and alert conditions, and to control and monitor all ACS devices and sensors. The user interface 51 may also be accessed remotely via wirelessly connected network devices, such as the mobile device 14 shown in FIG. 1. The exemplary interface 51 enables custom programming to establish predetermined automated actions or individual equipment state changes based on sensor data. For example, various sensor data may cause the pool ACS 10 to automatically activate specific devices if air temperature approaches freezing, or to deactivate equipment if no water flow is detected. The exemplary interface 51 may also be used to set alerts, priorities, and methods for receiving alerts. In exemplary embodiments, the pool ACS 10 may automatically notify the user through UI alerts, SMS text message, and/or email communication send to mobile device 14 in the event of predetermined conditions in or around the pool 12.

Exemplary Main Control Board (MCB)

Referring to FIGS. 2, 4A-4C, and 5, the MCB 21 of the present ACS 10 comprises a multi pin header which interfaces with the SOC 22, and a multi pin expansion header adapted for operative connecting a plurality of modular expansion cards 41 (or boards). The exemplary header interfacing with the SOC 22 comprises:

5 VDC pin to send+5 VDC to SOC.
GND pin to send GND to SOC.
3.3 VDC pin to receive+3.3 VDC from SOC for use in controlling I2C interface.
I2C SCL pin—receives clock signal for the I2C interface (+3.3 vdc line level).
I2C SDA pin—provides data signal for the I2C interface (+3.3 vdc line level).

The exemplary expansion header allows custom-selected connection of up to 6 modular expansion cards 41, as discussed further below, and comprises:

+24 VDC—access to the +24 VDC rail on the MCB.
+5 VDC—access to the +5 VDC rail on the MCB.
GND—access to the ground rail on the MCB.
I2C SCL/SDA pins for I2C (+5 vdc line level).
Address pins used to denote expansion slot # to expansion card.
+24 VAC Pins (Hot & Common).

Other exemplary features and components of the MCB include:

PCA9306 (or equivalent) to convert I2C 3.3 vdc line level to 5 vdc line level.
Multiple MCP23017 (or equivalent) for digital input/output used for (but not limited to) controlling pumps, lights, heaters, actuators, and interpreting digital signal input.
Multiple AZ951 (or equivalent) relays for additional control of direction of actuator turn.
Multiple AZ951 (or equivalent) relays for control of 24 VAC heaters.
DS2482S-800 (or equivalent) for I2C communication with temperature sensors.
PCF8591 ADC (or equivalent) Conversion of I2C to analog for input/output of analog signals using digital processing.
Multiple 2 pin connectors for external 24 VDC common relays.
Multiple 3 pin connectors for connecting 1 wire sensors to DS2482S-800.
Multiple 2 pin connectors for flow sensors and other on/off sensors.
Multiple 3 pin connectors for external valve actuators.
Multiple 2 pin connectors for 24 VAC low voltage relays.
Connector(s) for 24 VAC input to the onboard power converters.
Regulator and bridge system to take 24 VAC input and regulate to 24 VDC and 5 VDC for internal use.
LED indicators for status of relay outputs.
Safe shutdown circuit to provide power to SOC during external power failure and status signaling to/from SOC to signal SOC shutdown on loss of power.
Appropriate resistors, diodes, transistors, couplers, traces, rails, test points, capacitors, bridges, rectifiers, harnesses, clips, indicators, mounting holes, etc. to make the system robust, safe, diagnosable, and secure.

One function of the exemplary MCB 21 is to translate input from sensors onto the I2C communications protocol, and translate output from the I2C protocol into direct action via digital and analog output facilities. The board 21 may also display the status of some of those inputs and outputs directly to the user to aid in determining current status and to aid in troubleshooting. This gives the SOS 22 (microprocessor) access to the sensor data and the programmatic ability to affect external devices and equipment. This board 21 also houses an interface to the expansion cards 41. By using a base system and expansion slots 23, the cost and complexity of the base system may be reduced, without reducing the overall capability of the ACS 10.

Exemplary Microprocessor—System-on-Chip (SOC) 22

In the exemplary pool ACS 10, the SOC 22 implements core system processing as previously described. The exemplary SOC 22 comprises:

- Processor chip—a manufactured chip that contains all aspects of a microprocessor. Commonly used for embedded systems and small computers.
- USB interface.
- Ethernet port—provided through USB or via onboard chip.
- Wi-Fi module—provided through USB or via onboard chip and connector.
- Header connector to attach to the MCB; the connector comprising:
  - 5 VDC pin to accept +5 VDC from MCB.
  - GND pin to accept GND from MCB.
  - 3.3 VDC pin to pass 3.3 volts to MCB for use in controlling I2C interface.
  - I2C SCL pin—provides clock information for the I2C interface.
  - I2C SDA pin—provides data line to and from the SOC.
- Button to reset or shut down system.
- Status signaling to/from MCB to indicate software state and external power state. Used for controlled shutdown on power failure, and proper system restart.
- Additional memory system (e.g., non-volatile flash memory) to reduce reliance on using a SD-card for storage and allow backup of system settings.

The exemplary SOC may allow quick and convenient software updates transmitted as software patches and applied automatically or at user discretion. The SOC may also allow system expansion without requiring new core hardware. Through the SOC and expansion slots, new features and systems control may be made available to the user without requiring a complete or substantial system replacement, thereby reducing cost to the consumer and promoting full customization as new features and/or equipment become available. The exemplary SOC on separate PCB creates a modular system which facilitates upgrading, and lowers repair or replacement cost in the event a component is damaged.

Modularity, Expansion, and Customization

Figures 4A, 4B, 4C:
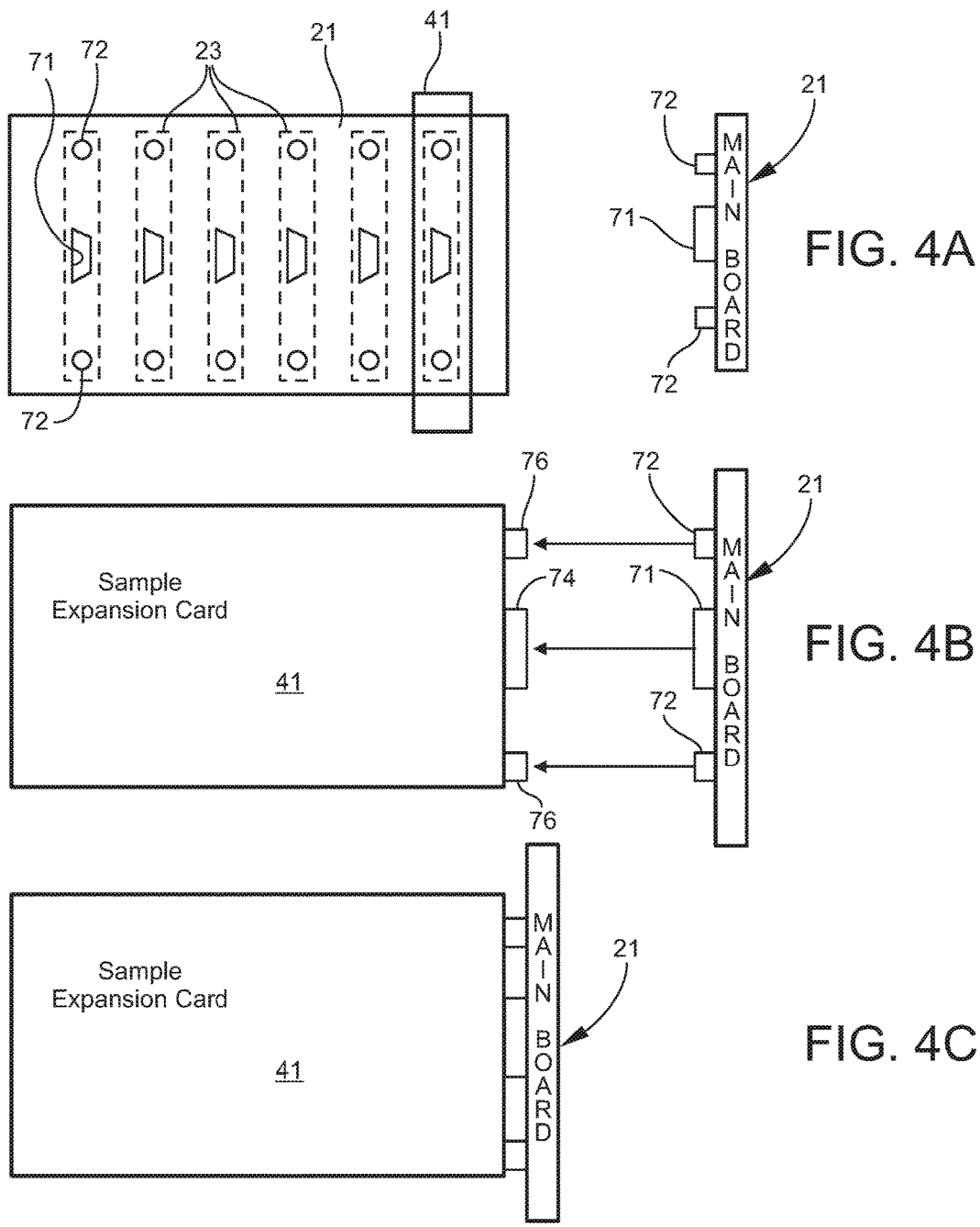
FIGS. 4A-4C demonstrate connection of exemplary expansion cards to the main control board (MCB) of the present ACS.
Figure 5:
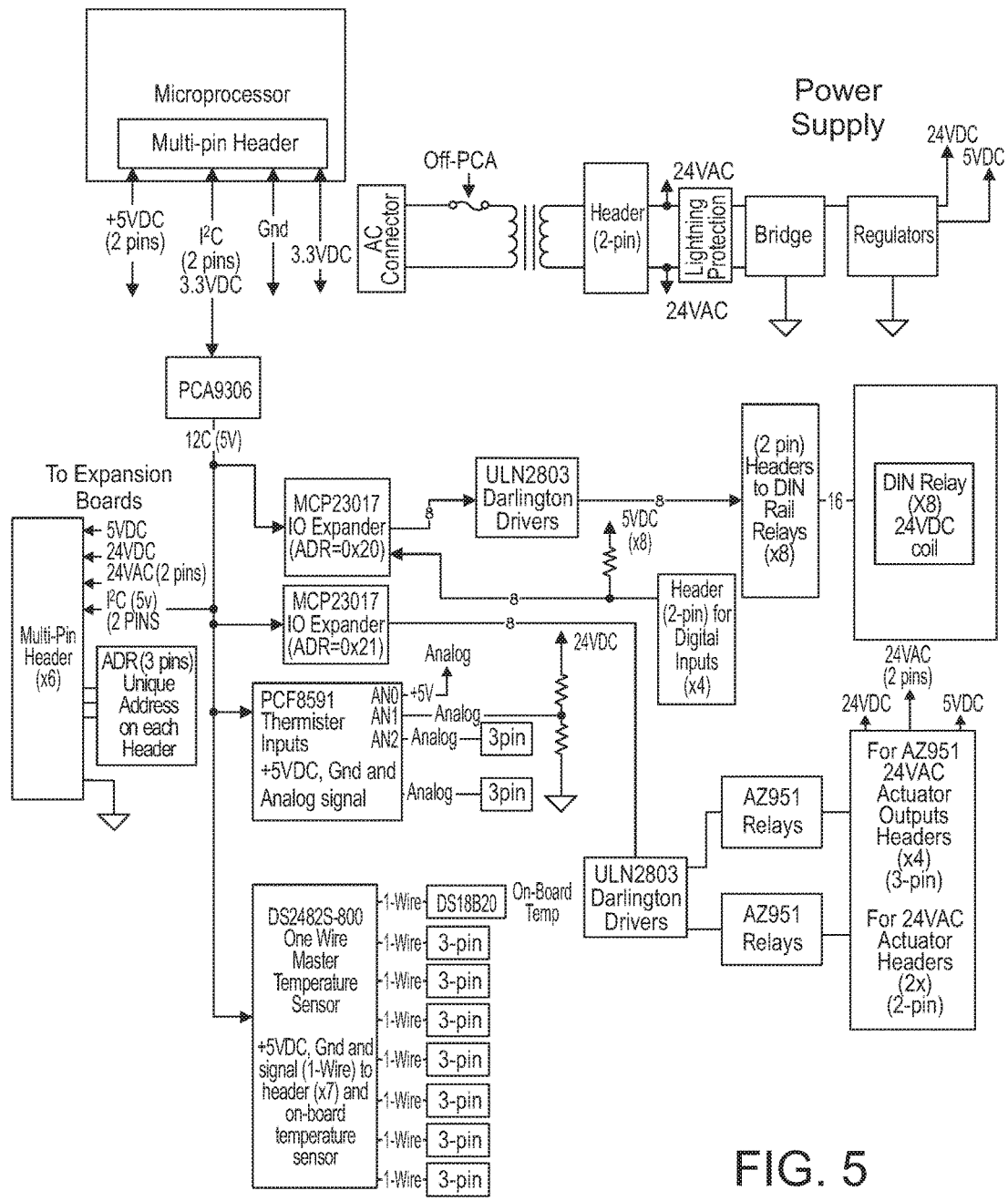
FIG. 5 is a diagram demonstrating certain connections and functionality of the present MCB.

FIGS. 4A, 4B, and 4C show detailed views of the expansion slots 23 and demonstrate how an external expansion card 41 may be operatively connected (inserted) to the ACS 10. Six identical expansion slots 23 exist on the MCB 21. Each expansion slot 23 includes a data/power port 71 and fasteners 72, while each expansion card 41 comprises a corresponding data/power connector 74 and fasteners 76. The fasteners 76 are designed to insert into respective fasteners 72 of the card slot 23 to hold the card in place. The data/power port 71 is shaped and located so that the expansion card 41 can only be inserted in one direction. Because of the design of the expansion cards 41, MCB 21, and ACS software, any certified expansion card 41 can be placed in any slot 23 and automatically integrated into the ACS 10 in a plug-and-play manner.

As indicated above, the exemplary pool ACS 10 incorporates an expansion system allowing users to custom select and integrate different modular external expansion cards 41. Each expansion card 41 may comprise:

- A multi pin header to provide access from the MCB and SOC allowing:
  - +24 VDC—access to the +24 VDC rail on the MCB.
  - +5 VDC—access to the +5 VDC rail on the MCB.
  - GND—access to the ground rail on the MCB.
  - I2C SCL/SDA pins for I2C (+5 vdc line level).
  - Address pins used to denote expansion slot # to expansion card.
  - +24 VAC Pins (Hot & Common).
- MCP23017 (or equivalent)—this uses the 3 bit address supplied by the MCB expansion slot to allow digital input and output to be accessed by the SOC.
- PCF8591 (or equivalent)—this also uses the 3 bit address supplied by the MCB to allow for analog input and output to be accessed by the SOC. It can be omitted if there is no need for an analog input/output ability, but if more than 15 types of expansion cards are produced, this chip will allow for additional card identification.
- All exposed connector pins are arranged on the expansion card to allow board connection in expansion slots without being blocked by other adjacent cards. The connector pins (or contacts) establish the electrical contact between the electronics on the expansion card and on the MCB/SOC.

The exemplary expansion system of the pool ACS 10 will allow users to mix and match up to six external expansion cards 41 in the original MCB 21. Each expansion slot 23 may comprise a unique binary address supplied to the expansion card 41. Through the i2c data bus and unique binary address supplied via the data/power connector, each card 41 may also respond to a standard query with a fixed response (by expansion type) that can be decoded by the software to allow the ACS 10 to determine the type of card 41 inserted in the specific expansion slot 23. Because this information will be consistently available across all expansion cards 41, each expansion card 41 can be queried via the same method regardless of its type or version. This modularity allows the ACS 10 to accommodate a virtually infinite number of expansion card types/versions.

Once an expansion card type is determined, the specific control software for that card type is activated on that expansion slot 23. As these checks are performed at every startup, and checked periodically, the pool ACS 10 can be reconfigured at any time while turned off. The ACS 10 will realize if a card 41 has been added or removed, and will automatically adjust. If an expansion card 41 has been added, through the UI, the pool ACS 10 will allow the user to configure the new card. If an expansion card 41 has been removed, the pool ACS 10 will automatically deactivate the configuration and the features that were on the removed card. If the same type of expansion card 41 is then replaced in the same slot 23, those stored configurations will be reactivated.

For example, if a salt cell controller is needed for a particular pool, then a salt expansion card can be readily added to the ACS. Through this customization, the user implements and maintains only those devices or systems which are needed, but every added device or system is controlled through a central interface and process. This allows the expansion cards 41 to interact and complement each other within the ACS 10, and to build onto a single cohesive system.

If more than the available six MCB expansion slots 23 are needed, secondary control housings can be incorporated in the pool ACS 10 to provide an interface with additional expansion slots. The secondary control housings may interface with and use the MCB software. This keeps all system control centralized and consistent regardless of system expansion.

With automatic software updates via network server 15, the pool ACS 10 may be capable of automatically recognizing and utilizing any expansion card 41—even if the card was developed after the base system was assembled and installed. If an expansion card 41 is unrecognized due to software updates being turned off, or if the card 41 is unauthorized, the pool ACS 10 will simply ignore the card and notify the user (via e-mail or SMS text message) of an unrecognized card inserted into the system.

(i) Example 1—External Expansion Card—Saltwater Chlorine Generator

In addition to the standard card elements indicated above, this expansion card 41 may include:
ACS712 (or equivalent) to measure the current flow to the salt cell.
An analog input on the PCF8591 (or equivalent) to measure the voltage to the salt cell.
Variable voltage regulator circuit to regulate the voltage within the range of 24 vdc to 32 vdc to maintain an optimum current by specific salt cell installed.
Digital potentiometer for control of voltage regulator circuit via digital output from MCP23017 (or equivalent).
External DC voltage power supply capable of 34 VDC and 8 amps.
Relay to control current direction via digital output from MCP23017 (or equivalent).

Figure 6:
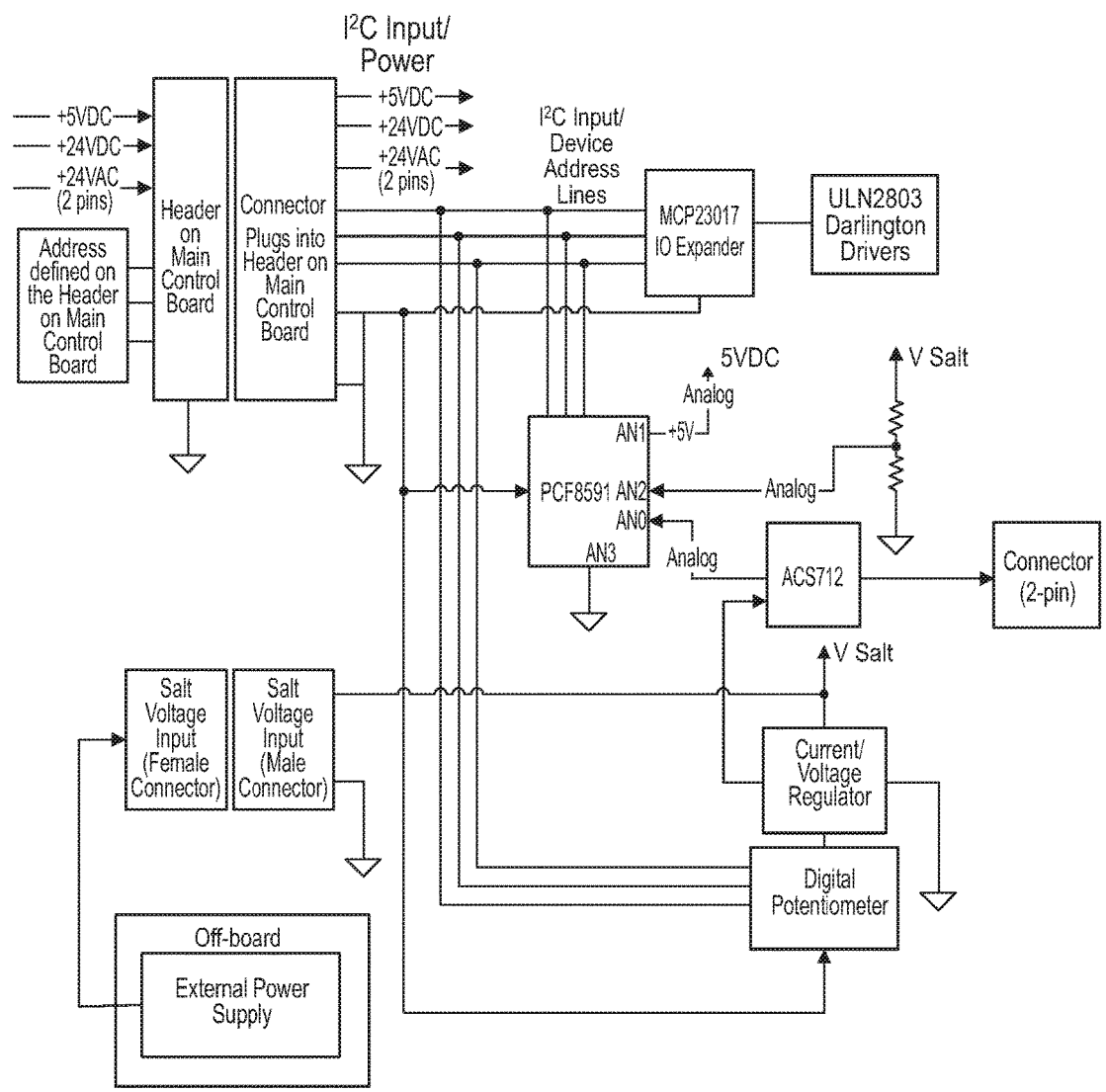
FIG. 6 is a diagram demonstrating the connection and functionality of an exemplary saltwater chlorine generator expansion card.

Referring to FIG. 6, the ACS software may use digital output, potentiometer, and a voltage regulator to control voltage supplied to the salt cell. By varying the voltage, optimum current flow may be maintained, thereby maintaining a constant, optimum, output of chlorine to the pool. The pool ACS may also reverse current flow to the cell on a programmed schedule. This helps keep the cell plates clean and efficient.

Through calculations involving current, voltage and water temperature, the pool ACS can gauge the indicated salt content of the water. If the pool ACS detects an inability to maintain a specific current within a set range of voltage, or other internal sensors (if installed) measure a difference between calculated salt level and sensed salt level, a notice can be sent to the user that shows indicated salt levels. The notice may advise the user to inspect the cell for buildup and clean or replace accordingly. Salt cells do have a limited lifespan, and need to be replaced after a certain amount of usage, but may need periodic cleaning. If indicated salt levels vary from manual readings taken by the user, or readings supplied by other sensors, then the user may be notified that the cells may need cleaning or replacing.

(ii) Example 2—External Expansion Card—Additional Relays

In addition to the standard card elements indicated above, this expansion card 41 may include:
Multiple 2 pin connectors for external 24 VDC common relays.
Indicator LED to show status of relay control.
Appropriate resistors, diodes, transistors, couplers, traces, test points, etc. to make the card robust, safe, diagnosable, and secure.

This expansion card adds 8 common relay connectors to expand the number of pumps, lights, 24 VDC heaters (and other such devices and equipment) that can be controlled by the pool ACS. Though the card is designed for relay control, it could also be used to control any 24 VDC low amperage switch or device.

(iii) Example 3—External Expansion Card—Additional Valve Actuators

In addition to the standard card elements indicated above, this expansion card 41 may include:
Multiple 3 pin connectors for external 24 VAC actuators.
Indicator LED to show status of actuator.
Multiple AZ951 relays (or equivalent) to control direction of actuator.
Appropriate resistors, diodes, transistors, couplers, traces, test points, etc. to make the card robust, safe, diagnosable, and secure.
Connection to external 24 VAC power supply if 24 VAC header rail cannot provide enough current.

This expansion card adds multiple 3 pin connectors, where one pin is common and the other two alternate 24 VAC hot, or nothing. This card expands the number of actuators that can be controlled by the pool ACS.

(iv) Example 4—External Expansion Card—Video Camera Monitoring

In addition to the standard card elements indicated above, this expansion card 41 may include:
Multiple industry standard camera connectors.
Connector back to SOC for video capture.
Appropriate signal converters, resistors, diodes, transistors, couplers, traces, test points, etc. to make the card robust, safe, diagnosable, and secure.
Connection to external power supply to supply power to cameras.

This expansion card adds an ability to monitor multiple cameras, and present the images captured to the user. The pool ACS can also record, store for a period of time, and then delete time stamped pictures from the cameras for later review. Storage time and photo frequency are user configurable.

(v) Example 5—External Expansion Card—Pool Water Level Control

In addition to the standard card elements indicated above, this expansion card 41 may include:
Connector for water level sensor back to analog input chip PFC8591 (or equivalent).
Multiple connectors for control of fill and drain valves attached to pool ACS.
Appropriate signal converters, resistors, diodes, transistors, couplers, traces, test points, etc. to make the card robust, safe, diagnosable, and secure.

This card measures pool level and maintains pool level within certain programmed parameters. Using a pool water level sensor connected through the analog chip, the pool water level can be determined and monitored. If the water level is outside of set parameters, either a fill valve or drain valve can be opened to return water level to the correct setting. If the pool requires draining or filling outside of normal amounts due to rainfall or evaporation, a notice can be sent to alert the user to unusual conditions. This alert may quickly notify the user of a leak, or possible flood conditions.

(vi) Example 6—External Expansion Card—Secondary Control Card

In addition to the standard card elements indicated above, this expansion card 41 may include:
Connector to external cabinet.
An I2C extender.
Appropriate signal converters, resistors, diodes, transistors, couplers, traces, test points, etc. to make the card robust, safe, diagnosable, and secure.
An additional board within the expansion cabinet may contain:
Multiple expansion slots.
Address shifter to allow components with same address as Main housing to appear at different address, expanding the addressable components.
Appropriate signal converters, resistors, diodes, transistors, couplers, traces, test points, etc. to make the card robust, safe, diagnosable, and secure.

This board adds additional expansion slots to an existing system. Because of the limitation of the I2C chips, only 8 chips are directly addressable. The MCB uses 2, so that leaves 6 possible for direct expansion. Through the use of an address shifter, this can be extended to make the expansion cabinet answer to unique addresses. This multiplies the number of available expansion slots exponentially.

System Sensors 34

In exemplary embodiments, the pool ACS 10 comprises sensor integration via sensor input connectors 26, as described above. The exemplary sensors 34 may increase functionality and operational capability of the pool ACS 10, and provide direct user access to relevant pool operation and maintenance data. Given the ability to add sensor data to the user interface and the ability to log this data, the user has access to current data as well as historical data. This data makes trend triggering possible. For example, if increased chlorine production historically is needed during a certain month, the pool ACS 10 can be programmed to provide that increase without having to wait for the user to notice the need. The exemplary ACS sensors 34 may comprise or utilize transceivers, transmitters or other communication module for wirelessly communicating their state or condition directly to the MCB 21 and SOS 22.

The base ACS 10 may be equipped with various sensors 34 including a temperature sensor (on the MCB), an ambient air temperature sensor that is recommended to be installed in the shade near the enclosure, and a water temperature sensor that can be inserted in the PVC pipe in the equipment area—proximate the control box but after the pump. The exemplary water sensor comprises a digital one-wire thermometer enclosed in a thermowell with an O-ring so that the housing can be inserted into a hole drilled into the PVC pipe. The O-ring makes a seal, and then a band clamp holds the unit tightly to the pipe to stop any water escaping. The exemplary air sensor comprises a digital one-wire thermometer enclosed in a waterproof container. Many systems may also require a flow sensor. In exemplary embodiments, the present ACS may function with any two wire on/off flow sensor rated for 15 GPM or more. The switch should short the two wires when flow is registered, and break the two wires when flow stops.

The exemplary pool ACS 10 may further comprise other sensors 34 including a combined flow/salt/temperature sensor, whereby flow is measured at speed, salt (salinity) through electrical conduction, and temperature through a digital thermometer. The sensor may combine data and send back to the MCB via a connector, thus allowing the pool ACS to report actual GPM flow rate, temperature and salinity directly to the user. If this sensor is installed and a salt water generator expansion card is in use, then salinity from the sensor may be compared to the salinity calculation from the cell and if a variance outside of a programmed range occurs, an alert can be sent to the user to inspect the cell.

Automatic System Updates and Remote Troubleshooting

The MCB 21 of the exemplary pool ACS 10 may incorporate, connect to, or communicate with various wireless components referred to broadly and generically herein as a wireless communication module—or alternatively, transceiver, transmitting device, receiving device, and/or transmitter-receiver. Exemplary wireless components may comprise a wireless transmitter, a wireless receiver, and wireless transceivers (e.g, RF, Wi-Fi, Bluetooth, cellular)—each of which may be connected to or communicate with the SOC. Other wireless components may include, for example, a 125 KHz LFID transmitter, 433 MHz receiver, 433 MHz transceiver, 13 MHz RFID (tag reader/rewriter) transceiver, 315/433-434 MHz RF transmitter, Bluetooth module, Wi-Fi module, integrated cellular transceiver, satellite data transceiver, and respective antennas. The wireless components may utilize any one or more of various wireless communications technologies for the transmission of data to and from the ACS, and between the ACS and a remote computer. Such wireless communications technologies include, for example, radio frequency (RF), Bluetooth, Wi-Fi, cellular, satellite, Low Power Wide Area Network (LPWAN) protocol, Near-Field Communication (NFC), Dedicated Short Range Communication (DSRC), Real Time Protocol/User Datagram Protocol/Internet Protocol (RTP/UDP), and Message Queue Telemetry Transport (MQTT).

Through Internet access and wireless data communication, the integrated MCB/SOC communication module allows automatic software updates and other wireless data transmission so that the pool ACS 10 stays current, and can except any available expansion card 41 in a convenient plug-and-play manner. If the user allows the ACS 10 to connect to network server 15, the system may also create an encrypted channel to the server. This allows secure user access to their pool ACS 10 from anywhere in the world, and enables SMS text, e-mail alerts, and other direct wireless communication to the user. The exemplary ACS 10 may also periodically transmit pool operational data and system use information to the server for evaluation.

Figure 7:
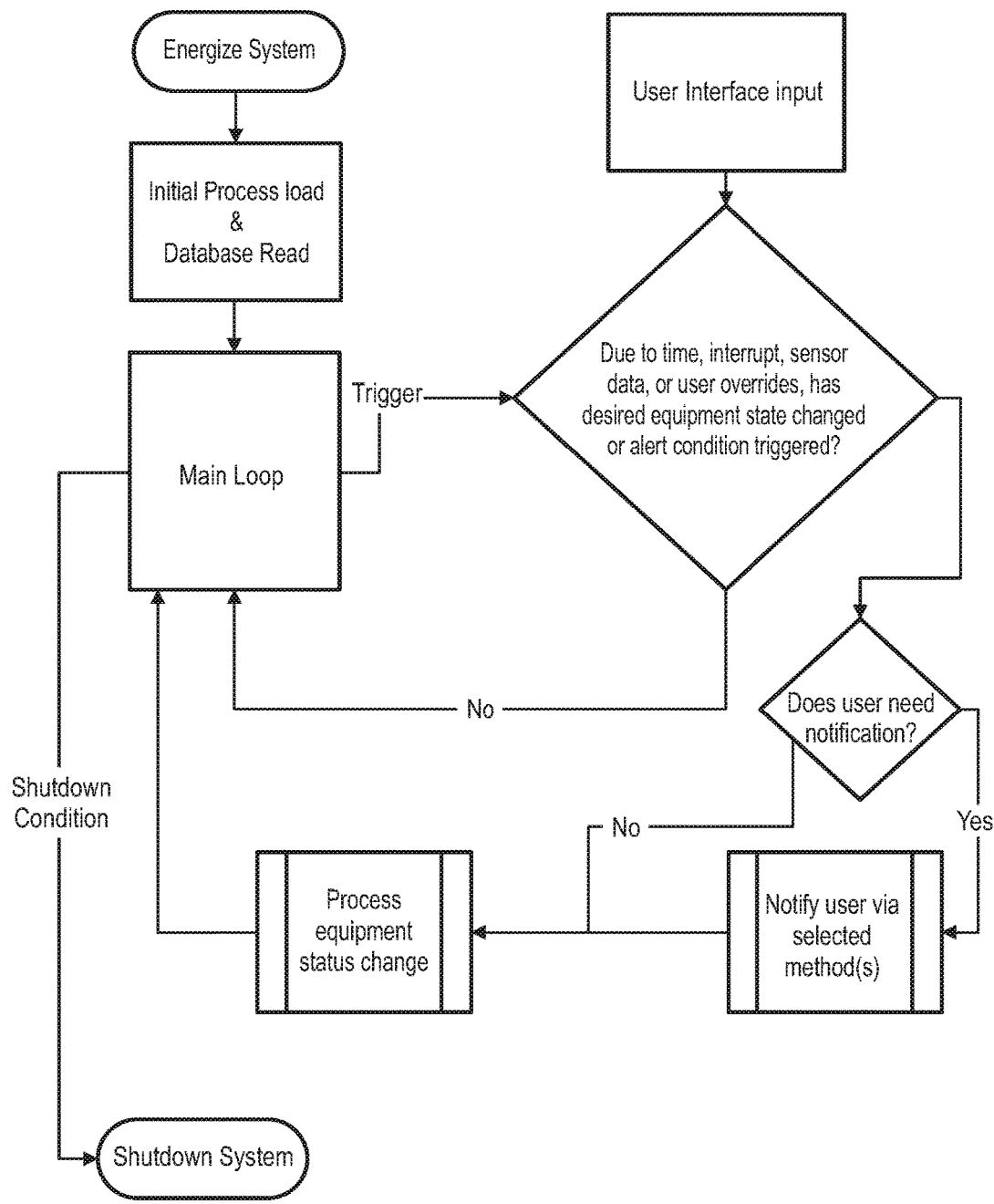
FIG. 7 is flow diagram demonstrating exemplary software features of the present ACS. System.

FIG. 7 comprises a general flow diagram illustrating software features of the exemplary pool ACS 10. Program flow may accept interrupts from the timer, sensors, and user interface Once the interrupt is triggered, the pool ACS will evaluate the sensors, scheduled events, and user inputted overrides to determine if any action is needed. If action is needed, the pool ACS may act on those actions, and determine if an alert or other information should be transmitted to the user. If applicable, the ACS will automatically transmit all programmed alerts/information (via SMS text message, e-mail, or other direct wireless communication). Once all programmed actions have been performed, the pool ACS will return to awaiting interrupts.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under 35 U.S.C. § 112(f) [or 6th paragraph/pre-AIA] is not intended. Additionally, it is not intended that the scope of patent protection afforded the present invention be defined by reading into any claim a limitation found herein that does not explicitly appear in the claim itself.

What is claimed:

1. A customizable pool automation control system, comprising:
    a system housing defining a protective enclosure;
    a processor located within said housing;
    a plurality of expansion slots formed with said housing, and operatively communicating with said processor; and
    a plurality of modular external expansion cards adapted for being custom selected by a user and inserted into respective expansion slots, said expansion cards being selected from a group consisting of a chlorine generator control, a water level control, a camera control, a valve actuator control, and a relay control;
    wherein said processor monitors and centrally controls each of said plurality of expansion slots, such that:
    (i) upon detection of an expansion card in an expansion slot, said pool automation control system activates control software associated with said expansion slot; and
    (ii) upon removal of an expansion card from an expansion slot, said pool automation control system automatically deactivates a configuration and features of said expansion card;
    whereby activation/deactivation of said plurality of expansion slots is automatically centrally controlled such that said pool automation control system implements and maintains only those control features of said expansion cards custom selected by a user.

2. The pool automation control system according to claim 1, and comprising a plurality of external sensors operatively connected to said processor.

3. The pool automation control system according to claim 2, wherein said sensors are selected from a group consisting of water flow sensor, water level sensor, ambient air temperature sensor, and water temperature sensor.

4. The pool automation control system according to claim 1, and comprising a wireless data communication module operatively connected to said processor, and adapted for transmitting data between said pool automation control system and a remote computer.

5. The pool automation control system according to claim 4, wherein said remote computer comprises a network server.

6. The pool automation control system according to claim 4, wherein said remote computer comprises a mobile device.

7. The pool automation control system according to claim 1, and comprising a main control board located within said housing.

8. The pool automation control system according to claim 7, and comprising a system on chip mounted on said main control board.

9. The pool automation control system according to claim 8, wherein said main control board further comprises a plurality of sensor input connectors.

10. The pool automation control system according to claim 9, wherein said main control board further comprises a plurality of device control connectors.

11. The pool automation control system according to claim 10, wherein said main control board further comprises a plurality of relay connectors.

12. The pool automation control system according to claim 1, wherein said housing comprises a touchscreen user interface operatively connected to said processor.

13. The pool automation control system according to claim 1, wherein said housing comprises a removable exterior cover.

14. A customizable pool automation control system, comprising:
    a system housing defining a protective enclosure;
    a processor located within said housing;
    a wireless data communication module operatively connected to said processor, and adapted for transmitting data between said pool automation control system and a remote computer;
    a plurality of external sensors operatively connected to said processor, and selected from a group consisting of water flow sensor, water level sensor, ambient air temperature sensor, and water temperature sensor;
    a plurality of expansion slots formed with said housing, and operatively communicating with said processor; and
    a plurality of modular external expansion cards adapted for being custom selected by a user and inserted into respective expansion slots, said expansion cards being selected from a group consisting of a chlorine generator control, a water level control, a camera control, a valve actuator control, and a relay control;
    wherein said processor monitors and centrally controls each of said plurality of expansion slots, such that:
    (i) upon detection of an expansion card in an expansion slot, said pool automation control system activates control software associated with said expansion slot; and (ii) upon removal of an expansion card from an expansion slot, said pool automation control system automatically deactivates a configuration and features of said expansion card;

whereby activation/deactivation of said plurality of expansion slots is automatically centrally controlled such that said pool automation control system implements and maintains only those control features of said expansion cards custom selected by a user.

15. The pool automation control system according to claim 14, wherein said remote computer comprises a network server.

16. The pool automation control system according to claim 14, wherein said remote computer comprises a mobile device.

17. The pool automation control system according to claim 14, and comprising a main control board located within said housing.

18. The pool automation control system according to claim 17, and comprising a system on chip mounted on said main control board.

19. The pool automation control system according to claim 18, wherein said main control board further comprises a plurality of sensor input connectors.

20. The pool automation control system according to claim 19, wherein said main control board further comprises a plurality of device control connectors.

* * * * *